(12) United States Patent
Cajias et al.

(10) Patent No.: US 11,922,801 B2
(45) Date of Patent: Mar. 5, 2024

(54) METHOD, APPARATUS, AND COMPUTER PROGRAM PRODUCT FOR REQUESTING TRAFFIC DATA USING SUBTREE DATA STRUCTURE

(71) Applicant: HERE Global B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 722 days.

(21) Appl. No.: 17/079,050

(22) Filed: Oct. 23, 2020

(65) Prior Publication Data

US 2022/0130244 A1 Apr. 28, 2022

(51) Int. Cl.
*G06F 16/29* (2019.01)
*G08G 1/00* (2006.01)

(52) U.S. Cl.
CPC .............. *G08G 1/00* (2013.01); *G06F 16/29* (2019.01)

(58) Field of Classification Search
CPC ................................. G06F 16/29; G08G 1/00
See application file for complete search history.

(56) References Cited

U.S. PATENT DOCUMENTS

| 6,728,628 | B2 | 4/2004 | Peterson |
| 8,332,131 | B2 | 12/2012 | Lee et al. |
| 8,750,845 | B2 | 6/2014 | Iwuchukwu |
| 9,863,780 | B2 | 1/2018 | Prestor et al. |
| 10,317,222 | B2 | 6/2019 | Maischberger et al. |
| 2021/0364318 | A1* | 11/2021 | Rolf .................. G01C 21/3896 |

OTHER PUBLICATIONS

Bando et al., "Flashtrie: Hash-based Prefix-compressed Trie for IP Route Lookup Beyond 100gbps", Apr. 2010, 9 pages.

* cited by examiner

*Primary Examiner* — Truong V Vo
(74) *Attorney, Agent, or Firm* — DITTHAVONG, STEINER & MLOTKOWSKI

(57) ABSTRACT

A method, an apparatus, and a computer program product may be provided for requesting traffic data. The apparatus may determine at least one map area comprising road segments, said map area having at least one map area identifier, determine road segment identifiers for the road segments of the at least one map area, send to a data service, a request for traffic data, said request identifying the map area, and receive from the data service, a subtree data structure set, the subtree data structure set comprising a plurality of subtree data structures, said subtree data structures in the set corresponding to traffic ranges. The apparatus may associate a road segment in a corresponding traffic range based on the road segment identifier satisfying one subtree data structure of the traffic range and provide the traffic range as traffic data for the road segment to a navigation application.

22 Claims, 8 Drawing Sheets

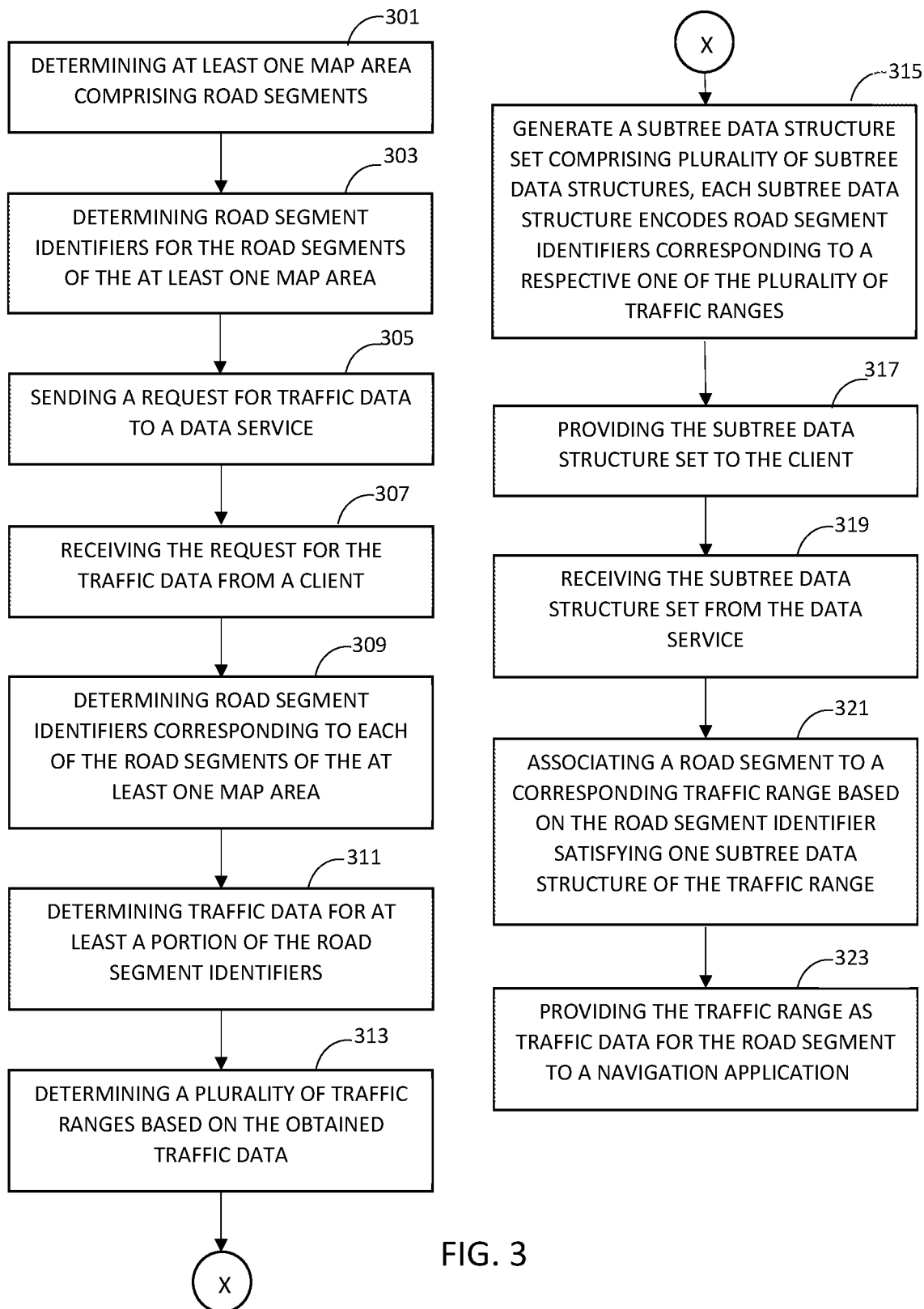

METHOD, APPARATUS, AND COMPUTER PROGRAM PRODUCT FOR REQUESTING TRAFFIC DATA USING SUBTREE DATA STRUCTURE

TECHNOLOGICAL FIELD

Example embodiments relate generally to navigation systems and more particularly relate to subtree data structure enabled information exchange between a data service and a client device for requesting traffic data of a geographic region in a map version agnostic manner.

BACKGROUND

Generally, a client may submit a request for traffic data associated with a map region to a server and the server may process the traffic data request to provide the traffic data for the map region. Names or identifiers (IDs) may be used by the server to represent road segments associated with the map region. Problems may arise in generating the traffic data using the IDs of the road segments when the client is not operating with a most recent map version. For example, an older map version installed on the client may not include up-to-date road segments and traffic data associated with the road segments which is otherwise present in the most recent map version of the server. In such cases, the server needs to maintain multiple map versions, to provide identifiable traffic data. However, this approach is problematic as a limited number of map versions may be stored within a finite amount of server space. Performance and maintenance issues may also exist due to the storage of a large number of map versions. Additionally, this approach may not allow for rapid refreshing (e.g., weekly/daily updates) of the map stored on the server.

BRIEF SUMMARY OF SOME EXAMPLE EMBODIMENTS

Various embodiments provide for requesting and generating traffic data of a geographic region in a map version agnostic manner. As used herein, map version agnostic information/data is map information/data that is independent of a particular version of the digital map. For example, map version agnostic information/data is map information/data that is not expected to change between a first version of the digital map and a second version of the digital map. As used herein, a digital map is map content of the world in a form of structured data. In various embodiments, the map content may include map features such as physical features on the ground (e.g., roads, buildings, and the like). Various embodiments provide for the transmission of the traffic data in a bandwidth efficient manner. In various embodiments, the traffic data correspond to up-to-date traffic data of the geographic region. For example, the up-to date traffic data is the traffic data associated with most recent version of the digital map. Various embodiments provide for encoding one or more traffic ranges using map version agnostic identifiers that are encoded into one or more subtree data structures, such that the encoded one or more traffic speed ranges may be transmitted as a compact data payload.

In an embodiment, when the digital map is partitioned in two dimensions (in a gridded form), each cell of the grid may indicate a map area. In an embodiment, a shape of the cell may be a square, a rectangular, a pentagonal, a tile of a tessellation, or the like. The cell may cover a portion of geographical region (e.g., an area) of the digital map. Accordingly, the cell of the grid is coined to be the map area. In various embodiments, each map area may be identified by a unique map area identifier (also referred to as "map area ID"). In some example embodiments, the map area may indicate a current area visible on a screen of the client. In an example embodiment, the map area comprises road segments. Generating the traffic data for the road segments of the map area may include three steps: (i) transmission of a traffic data update request for at least one map area, from a client to a data service; (ii) generation of encoded traffic data for the at least one map area in the data service and transmission of the encoded traffic data in a bandwidth efficient manner from the data service to the client; and (iii) decoding the received encoded traffic data in a map version agnostic manner.

In various embodiments, the client may have a client version of a digital map stored in memory of the client. For example, the client version of the digital map may be obtained from a mapping platform and stored in memory of the client. The client may transmit the traffic data request for at least one map area identifier (ID). In an example embodiment, the traffic data request is a request for up-to-date speed data (e.g., historical traffic patterns, real-time speed information from other vehicles traversing the road segments, or a combination of both, sometimes referred to as speed predictions) associated with the road segments of the map area ID. Additionally, the client may also transmit a traffic resolution value/parameter of the map area ID. The traffic resolution value of the map area ID may correspond to a number, where the number indicates a number of ranges the traffic data of the road segments has to be grouped into.

In various embodiments, the data service may have a data service version of the digital map stored in memory of the data service. For example, the data service version of the digital map may be the most recent version of the digital map. In various situations, the client version and the data service version may be different versions of the digital map. The data service may receive the traffic data request for the map area ID transmitted by the client. The data service may determine a data service version of traffic data, using the data service version of the digital map, for each road segment of the received map area ID.

Further, the data service may determine first road segments among the road segments of the map area ID, where the first road segments are the road segments that contain traffic data. The data service may generate a road segment identifier for each of the first road segments. In an example embodiment, the data service may determine map version agnostic identifiers to generate the road segment identifiers. In various embodiments, a map version agnostic identifier of a road segment may be a particular element and/or particular combination of elements of map version agnostic information corresponding to the road segment. According to some example embodiments, the map version agnostic information may include a name of the road segment, a travel direction of the road segment, a functional class of the road segment, speed limit of the road segment, and/or the like. The data service may code each of the map version agnostic identifier using one or more coding functions. According to some example embodiments, the coded map version agnostic identifiers may be the road segment identifiers.

Furthermore, the data service generates a plurality of road segment identifier sets (S_i). The plurality of road segment identifier sets may be generated using the traffic data of the road segments and the road segment identifiers of the road segments. According to some example embodiments, the road segment identifier set may comprise one or more road segment identifiers that identify the road segments in the data service version of the digital map. In an embodiment, the road segments (or road segment identifiers) belonging to one particular range of speed value are grouped together to generate a road segment identifier set (also referred as traffic speed range), where each road segment identifier set indicates a range of the traffic data. For example, if a road segment identifier set has a traffic speed range of 21-30 km/h, then all the road segment identifiers falling within or on the range of 21-30 km/h are members of the road segment identifier set with the range 21-30 km/h.

Furthermore, the data service may generate a plurality of identifier test sets (T_i) for the plurality of road segment identifier sets (S_i). In accordance with an embodiment, each identifier test set of the plurality of identifier test sets (T_i) may correspond to the respective one of the plurality of road segment identifier sets (S_i). In various embodiments, the identifier test set (T_I) may be the corresponding complement set for the road segment identifier set (S_I). For example, an identifier test set (T_0) may be the complement set for the road segment identifier set (S_0) and accordingly, there may be no overlap between the members of the sets (T_0) and (S_0). Alternately, consider a first identifier test set (T_0), a second identifier test set (T_1), and a third identifier test set (T_2) that may be generated for a first road segment identifier set (S_0), a second road segment identifier set (S_1), and a third road segment identifier set (S_2) respectively. According to some example embodiments, members of the first identifier test set (T_0) may be the members of the second road segment identifier set (S_1) and the third road segment identifier set (S_2). Similarly, members of the second identifier test set (T_1) may be the members of the first road segment identifier set (S_0) and the third road segment identifier set (S_2). Further, members of the third identifier test set (T_2) may be the members of the first road segment identifier set (S_0) and the second road segment identifier set (S_1).

Furthermore, the data service may generate a 'set of subtree data structures' for the plurality of road segment identifier sets. In general, a subtree data structure is a space-efficient probabilistic data structure that is used to test whether an element is a member of a set. False positive matches are possible, but false negatives are not. In other words, a query of a subtree data structure returns either "possibly in set" or "definitely not in set." For example, to add a set element to the subtree data structure, each of K coding functions are used to identify K ordered bit values for the set element. The subtree data structure is then updated to include a node corresponding to each of the K ordered bit values for the set element with each bit value corresponding to a level of the subtree data structure. For example, a first coding function is evaluated for the set element to determine a first bit value (e.g., 0 or 1) and the subtree data structure is updated to include a node corresponding to the first bit value on the first level of the subtree data structure. A second coding function is evaluated for the set element to determine a second bit value (e.g., 0 or 1) and the subtree data structure is updated to include a node corresponding to the second bit value on the second level of the subtree data structure that is linked to and/or is a child node of the first bit value on the first level of the subtree data structure. The process continues until the subtree data structure includes a bit value corresponding to the set element for each level of the subtree data structure such that the subtree data structure may be traversed in a manner corresponding to the ordered bit values corresponding to the set element. To query the subtree data structure to test whether a test element is in the set, the test element is coded using each of the K coding functions to determine K ordered bit values corresponding to the test element. If the subtree data structure cannot be traversed along a path corresponding to the K ordered bit values, the test element is definitely not in the set. If the subtree data structure can be traversed along a path corresponding to the K ordered bit values, then it is possible that the test element is a member of the set encoded by the subtree data structure.

The subtree data structure set contains several subtree data structures, each subtree data structure may correspond to a road segment identifier set among the plurality of road segment identifier sets. For example, each subtree data structure of the subtree data structure set may correspond to a traffic speed range. In various embodiments, each road segment identifier of a respective one of the plurality of road segment identifier sets may be added to a respective subtree data structure. For example, a first road segment identifier set (S_0), a second road segment identifier set (S_1), and a third road segment identifier set (S_2) may have traffic speed ranges as 1-20 km/h, 21-40 km/h, and 41-60 km/h respectively. Accordingly, the subtree data structure set may contain three subtree data structures SDS_0, SDS_1, and SDS_2. The three subtree data structures SDS_0, SDS_1, and SDS_2 may correspond to sets (S_0), (S_1), and (S_2) respectively. All road segment identifiers of the first road segment identifier set (S_0) is added to the subtree data structure SDS_0. Similarly, the subtree data structure SDS_1 may encode the second road segment identifier set (S_1) and the subtree data structure SDS_2 may encode the third road segment identifier set (S_2). Therefore, each subtree data structure may encode the road segment identifiers that conform to the traffic data of that subtree data structure.

Each subtree data structure of the subtree data structure set may be of size m that is relatively small (e.g., the number of elements in the corresponding road segment identifier set) such that the probability of false positives is arbitrarily high. Each subtree data structure of the subtree data structure set may then be tested to determine whether, a query of each subtree data structure of the subtree data structure set provides a false positive. For example, the three subtree data structures (from above example) SDS_0, SDS_1, and SDS_2 may be tested with the three identifier test sets T_0, T_1, and T_2 respectively. In various embodiments, members of the identifier test set are the coded map version agnostic identifiers (e.g., road segment identifiers). Therefore, each member of the first identifier test set (T_0) may be used to test the subtree data structure SDS_0 to determine whether, the subtree data structure SDS_0 provides false positive. Similarly, the second identifier test set (T_1) and the third identifier test set (T_2) may be used to test the subtree data structure SDS_1 and the subtree data structure SDS_2 respectively. When any subtree data structure of the subtree data structure set provides false positive, then the corresponding subtree data structure is rejected and a larger subtree data structure may be generated of size m+n, where n may be equal to 1. The testing process may be repeated until the query of each subtree data structure of the subtree data structure set does not return any false positive.

Furthermore, the data service provides the subtree data structure set as encoded traffic data for the received map area ID. According to some embodiments, the encoded traffic speed data comprise time information of the traffic data, and a total count of encoded road segments of the map area ID. The data service may transmit the generated encoded traffic data to the client. In various embodiments, the client may use the subtree data structure set and the client version of the digital map to decode the traffic data of the map area ID. According to some example embodiments, each subtree data structure of the subtree data structure set may indicate an encoded version of road segments corresponding to the range of the traffic data. Accordingly, the traffic data of the road segments of the map area ID may be determined by the subtree data structures in the subtree data structure set.

The client device (also referred to as "client") may update the determined traffic data. According to some example embodiments, the client or an application associated with the client accesses the updated traffic data to control a vehicle (e.g., a control signal) such that the vehicle may accelerate/decelerate to the traffic data (speed value), and/or use the traffic data and/or other information/data provided in the encoded traffic data to perform one or more navigation functions. Some non-limiting examples of navigation functions include localization, speed determination, lane level speed determination, travel time determination, speed guidance, lane level speed guidance, provision of traffic information/data, provision of lane level traffic information/data, vehicle speed and/or handling control, and/or the like.

Thus, the traffic data of the map tile may be determined using the data service version of the digital map and then decoded using the client version of the digital map such that differences between the data service version and the client version of the digital map may be tolerated. Additionally, the bandwidth used to provide the traffic data is minimized by encoding the road segments belonging to the one particular range of traffic data, using the smallest bit arrays that do not provide any false positives for road segments belonging to other ranges of traffic data.

An apparatus, a method, and a computer program product may be provided for requesting traffic data. The apparatus may include a memory configured to store computer program code and one or more processors configured to execute the computer program code to determine, at least one map area comprising road segments, said map area having at least one map area identifier. The one or more processors may be further configured to determine road segment identifiers for the road segments of the at least one map area, send to a data service, a request for traffic data, said request identifying the map area, and receive from the data service, a subtree data structure set, the subtree data structure set comprising a plurality of subtree data structures, said subtree data structures in the set corresponding to traffic ranges. The one or more processors may be further configured to associate a road segment to a corresponding traffic range based on the road segment identifier satisfying one subtree data structure of the traffic range and provide traffic range as traffic data for the road segment to a navigation application.

According to some example embodiments, the one or more processors may be further configured to determine a geographic region encompassing at least a portion of a route, determine, for the geographic region, a plurality of map areas covering the at least one portion of a route, and include the multiple map area identifiers in the request for traffic data.

According to some example embodiments, the one or more processors may be further configured to determine expected validity timeframes for the traffic data of the at least one map area, include the expected validity timeframes in the request.

According to some example embodiments, the at least one map area may correspond to one or more map areas and wherein the at least one map area identifier corresponds to one or more map tile identifiers.

According to some example embodiments, the subtree data structure may be a prefix hash subtree or a prefix-compressed hash subtree.

According to some example embodiments, the one or more processors may be further configured to determine a traffic resolution parameter and send the traffic resolution parameter as part of the request.

According to some example embodiments, the request for traffic data may be a request for traffic speed data and the traffic resolution parameter is based on a maximum speed limit of the at least one map area.

According to some example embodiments, to determine the road segment identifiers, the one or more processors may be further configured to access map version agnostic information regarding each of the road segments, generate a map version agnostic identifier for each of the road segments, code the map version agnostic identifier for each of the road segments using at least one coding function, and provide the coded map version agnostic identifier as the road segment identifier.

According to some example embodiments, the one or more processors may be configured to, assign traffic data to a second road segment based on either a local road segment speed limit parameter, a local road segment traversal cost parameter, or a local historical traffic speed pattern of the second road segment, in response to a road segment identifier of the second road segment not satisfying any of the received subtree data structures.

Embodiments disclosed herein may provide a method that includes determining, at least one map area comprising road segments, said map area having a map area identifier, determining road segment identifiers for the road segments of the at least one map area, sending, to a traffic data service, a request for traffic data, said request identifying the map area, receiving, from the data service, a subtree data structure set, the subtree data structure set comprising a plurality of subtree data structures, said subtree data structures in the set corresponding to traffic ranges, associating a road segment to a corresponding traffic range based on the road segment identifier satisfying one subtree data structure of the traffic range, and providing the traffic range as traffic data for the road segment to a navigation application.

According to some example embodiments, the method may further comprise determining a geographic region encompassing at least a portion of a route, determining, for the geographic region, a plurality of map areas covering the at least one portion of a route, and including the multiple map area identifiers in the request for traffic data.

According to some example embodiments, the method may further comprise determining expected validity timeframes for the traffic data of the at least one map area and, including the expected validity timeframes in the request.

According to some example embodiments, the at least one map area may correspond to one or more map areas and wherein the at least one map area identifier may correspond to one or more map tile identifiers.

According to some example embodiments, the subtree data structure may be a prefix hash subtree or a prefix-compressed hash subtree.

According to some example embodiments, the method may further comprise determining a traffic resolution parameter and sending the traffic resolution parameter as part of the request.

According to some example embodiments, the request for traffic data may be a request for traffic speed data and the traffic resolution parameter is based on a maximum speed limit of the at least one map area.

According to some example embodiments, to determine the road segment identifiers, the method may further comprise accessing map version agnostic information regarding each of the road segments, generating a map version agnostic identifier for each of the road segments, coding the map version agnostic identifier for each of the road segments using at least one coding function, and providing the coded map version agnostic identifier as the road segment identifier.

According to some example embodiments, the method may further comprise assigning traffic data to a second road segment based on either a local road segment speed limit parameter, a local road segment traversal cost parameter, or a local historical traffic speed pattern of the second road segment, in response to a road segment identifier of the second road segment not satisfying any of the received subtree data structures.

Embodiments of the present disclosure provide a computer program product comprising a non-transitory computer readable medium having stored thereon computer executable instructions, which when executed by one or more processors, may cause the one or more processors to carry out operations for requesting traffic data, the operations comprising: determining at least one map area comprising road segments, said map area having at least one map area identifier, determining road segment identifiers for the road segments of the at least one map area, sending to a data service, a request for traffic data, said request identifying the map area, receiving from the data service, a subtree data structure set, the subtree data structure set comprising a plurality of subtree data structures, said subtree data structures in the set corresponding to traffic ranges, associating a road segment to a corresponding traffic range based on the road segment identifier satisfying one subtree data structure of the traffic range, and providing the traffic range as traffic data for the road segment to a navigation application.

In an example embodiment, the operations may further comprise determining a traffic resolution parameter and sending the traffic resolution parameter as part of the request.

In an example embodiment, the request for traffic data may be a request for traffic speed data and the traffic resolution parameter is based on a maximum speed limit of the at least one map area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
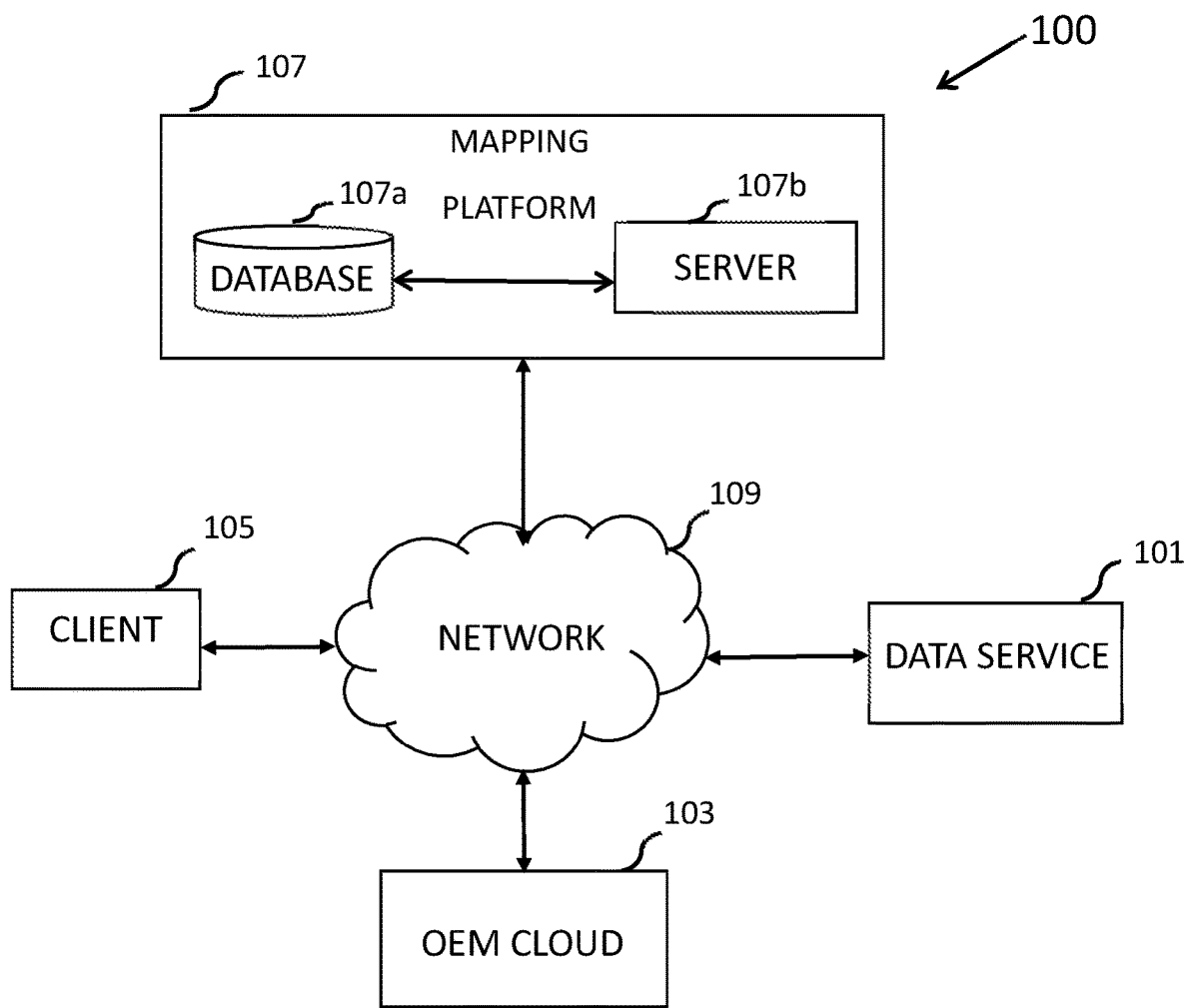
Figures 2A, 2B:
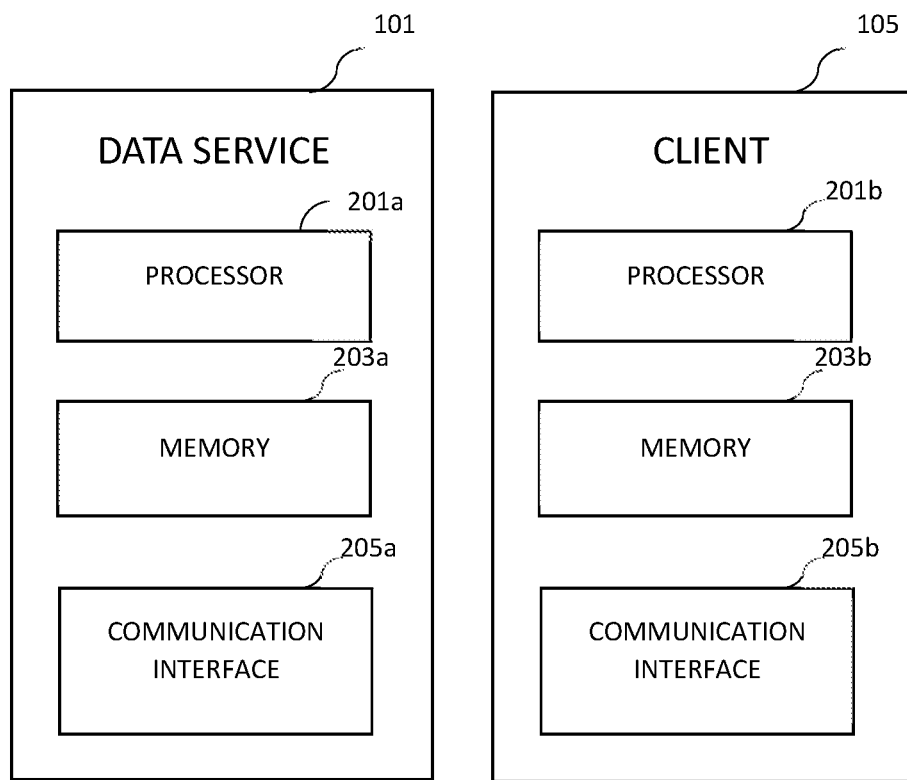
Figure 4:
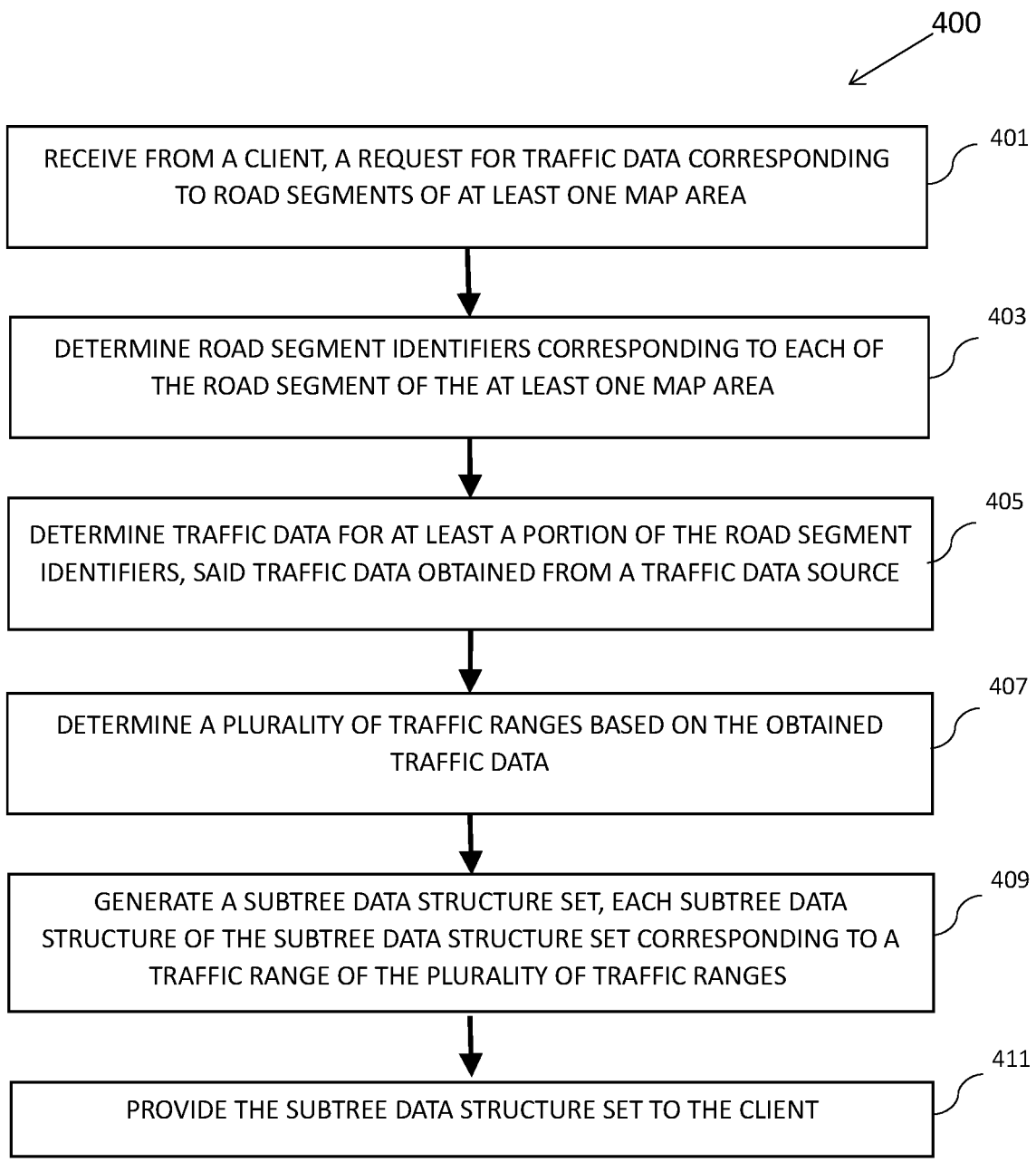
Figure 5:
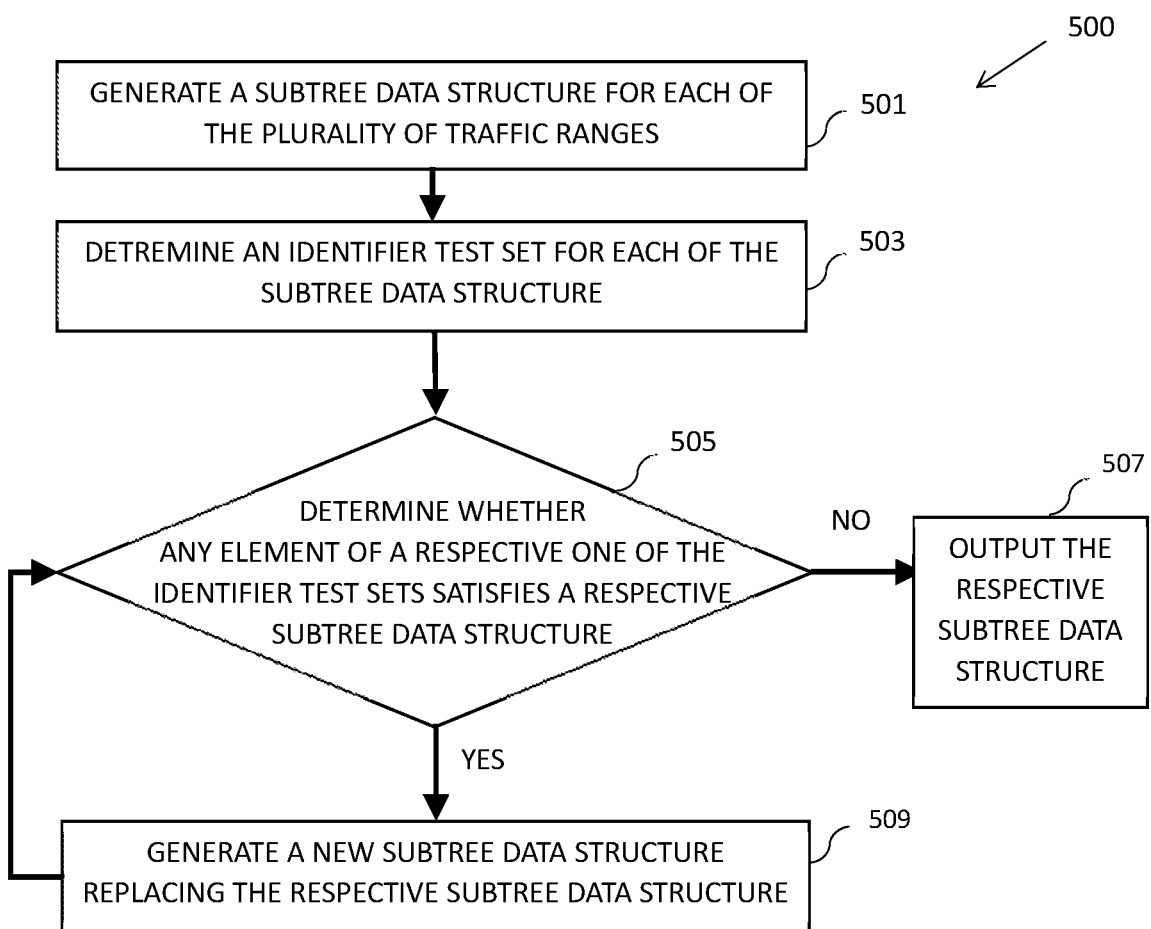
Figure 6:
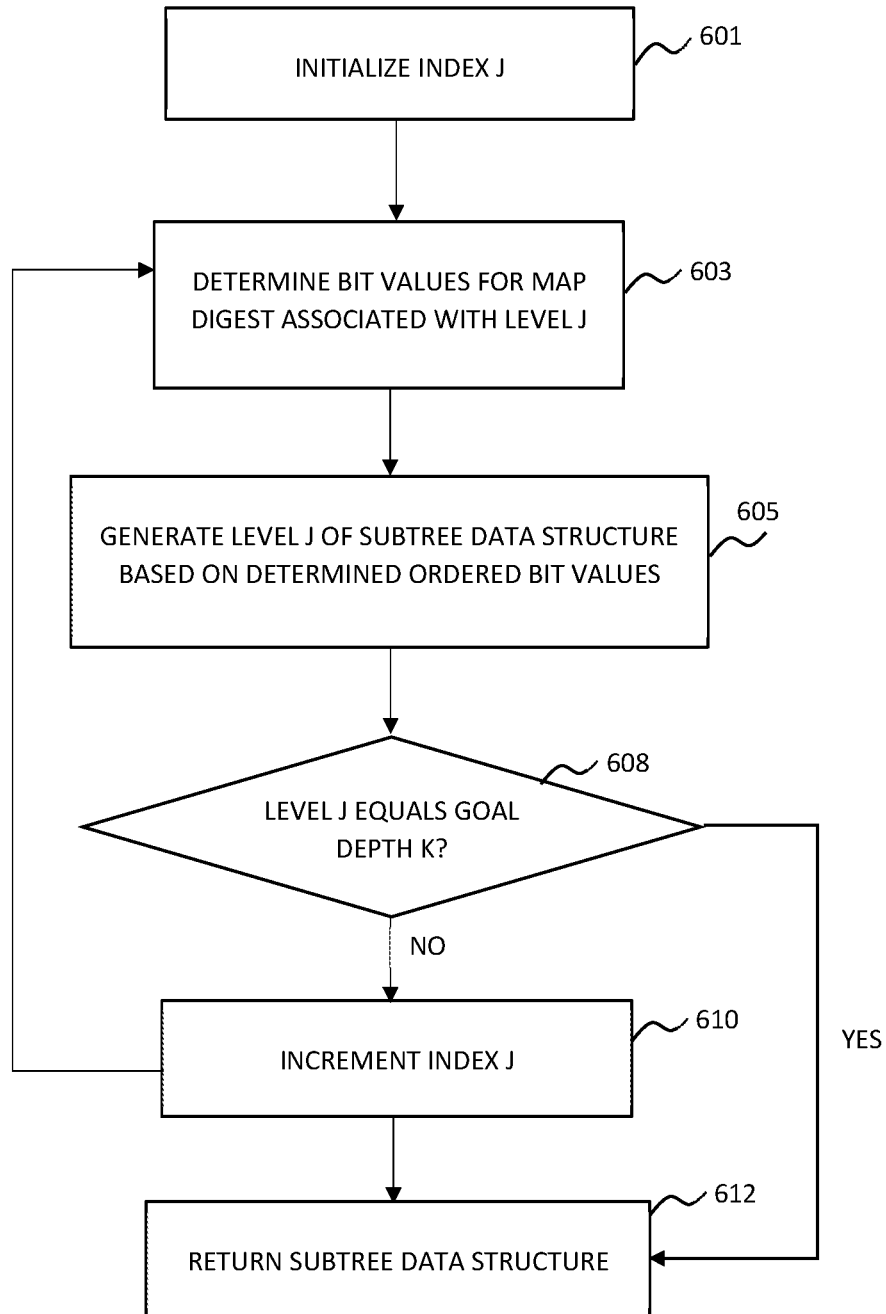
Figure 7:
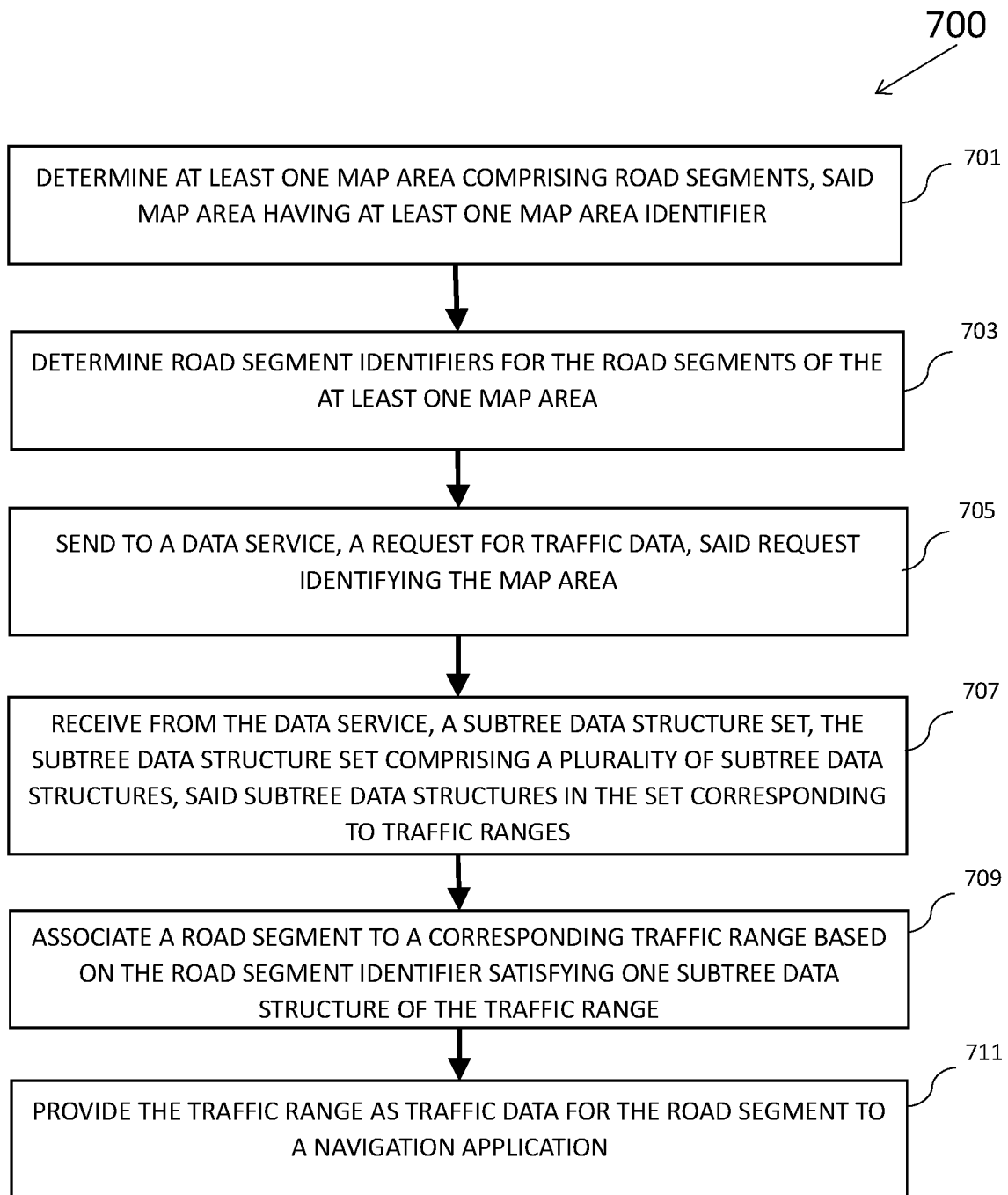
Figure 8:
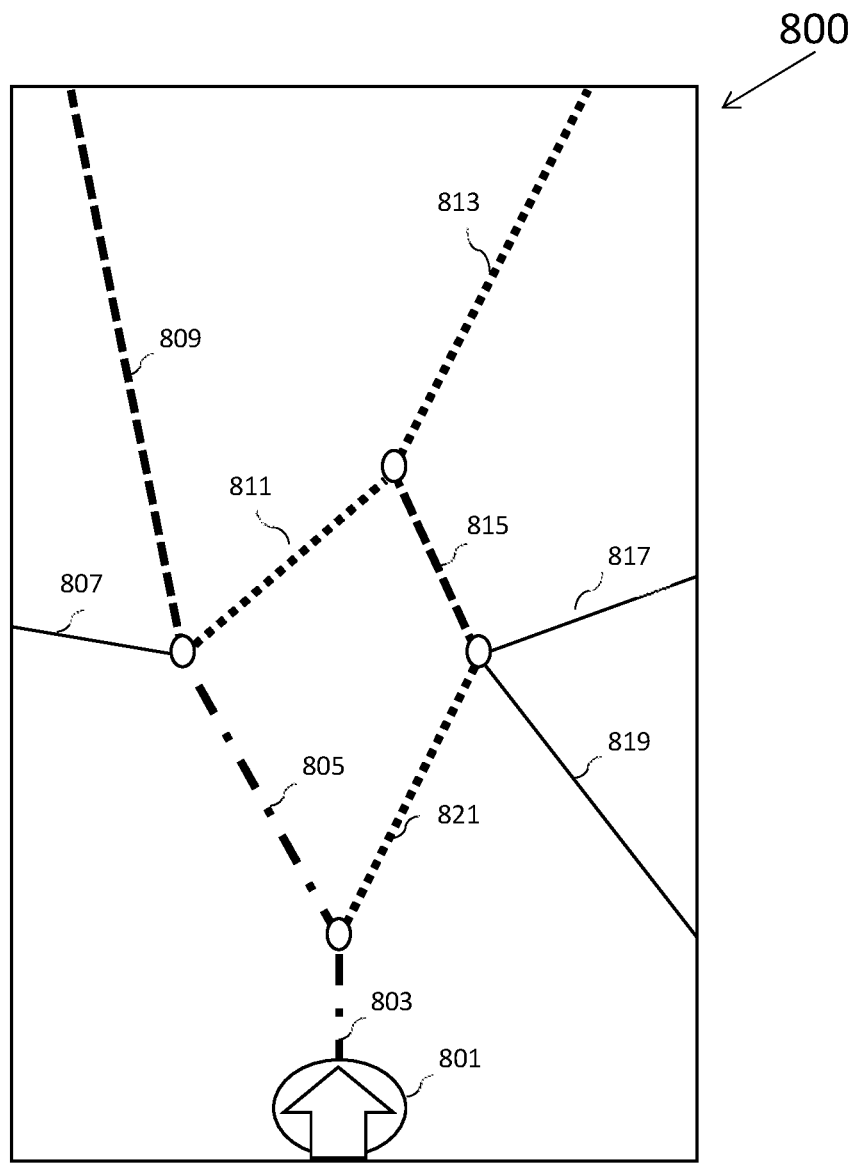

Having thus described example embodiments of the invention in general terms, reference will now be made to the accompanying drawings, which are not necessarily drawn to scale, and wherein:

FIG. 1 illustrates a block diagram showing an example architecture of one or more example embodiments;

FIG. 2A illustrates a block diagram of a data service for providing traffic data, in accordance with one or more example embodiments;

FIG. 2B illustrates a block diagram of a client device for requesting traffic data, in accordance with one or more example embodiments;

FIG. 3 illustrates a flow chart representing general overview of steps performed by the client device and the data service for executing traffic data protocol, in accordance with an example embodiment;

FIG. 4 illustrates a flow chart of operations performed by the data service of FIG. 2A for providing traffic data, in accordance with an example embodiment;

FIG. 5 illustrates a flow chart of operations performed by the data service of FIG. 2A for generating a subtree data structure set, in accordance with an example embodiment;

FIG. 6 illustrates a flowchart of operations performed, such as by the data service of FIG. 2A for building the subtree data structure, in accordance with an example embodiment;

FIG. 7 illustrates a flow chart of operations performed by the client of FIG. 2B for retrieving traffic data, in accordance with an example embodiment; and FIG. 8 illustrates an exemplary map area for which traffic data may be retrieved by the client device of FIG. 2B, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Various embodiments of the present disclosure provide means through which, the traffic data of the map area may be determined using the data service version of the digital map and then decoded using the client version of the digital map. Therefore, the differences between the data service version and the client version of the digital map may be minimized. Additionally, the bandwidth used to provide the traffic data is minimized by encoding the road segments belonging to the one particular range of traffic data, using the smallest bit arrays that do not provide any false positives for road segments belonging to other ranges of traffic data. These and other technical improvements of the invention will become evident from the description provided herein.

FIG. 1 illustrates a block diagram 100 of an example architecture of one or more example embodiments. As shown in FIG. 1, the block diagram 100 may include a data service 101, an Original Equipment Manufacturer (OEM) cloud 103, a client 105, a mapping platform 107, and a network 109. In various embodiments, the data service 101 may be a backend server, a remotely located server, or the like. In an embodiment, the data service 101 may be the server 107b of the mapping platform 107 and therefore may be co-located with or within the mapping platform 107. In various embodiments, the client 105 may be onboard a vehicle. In various embodiments, the client 105 may be a vehicle navigation system, vehicle control system, a mobile computing device and/or the like.

The mapping platform 107 may comprise a database 107a for storing map data and a server 107b. The database 107a may store node data, road segment data, link data, link identification information, heading value records, point of interest (POI) data, or the like. The database 107a may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107a may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107a may also store data about the POIs and their respective locations in the POI records. The database 107a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the database 107a can include event data (e.g., traffic incidents, construction activities, scheduled events, unscheduled events, accidents, diversions etc.) associated with the POI data records or other records of the database 107a. Optionally or additionally, the database 107a may store 3D building maps data (3D map model of objects) of structures surrounding roads and streets.

The database 107a may be maintained by a content provider e.g., a map developer. By way of example, the map developer may collect geographic data to generate and enhance the database 107a. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Also, remote sensing, such as aerial or satellite photography, may be used to generate map geometries directly or through machine learning as described herein.

The database 107a may be a master database stored in a format that facilitates updating, maintenance, and development. For example, the master database or data in the master database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by client such as the client 105, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received database in a delivery format to produce one or more compiled navigation databases.

As mentioned above, the database 107a may be a master geographic database, but in alternate embodiments, the database 107a may be embodied as a client-side database and may represent a compiled navigation database that may be used in or with end user devices (e.g., the client 105) to provide navigation and/or map-related functions. For example, the database 107a may be used with the client 105 to provide an end user with navigation features. In such a case, the database 107a may be downloaded or stored on the client 105.

The server 107b may comprise processing means and communication means. For example, the processing means may comprise one or more processors configured to process requests received from the client 105. The processing means may fetch map data from the database 107a and transmit the same to the client 105 and/or the data service 101 in a format suitable for use by the client 105 and/or the data service 101. In one or more example embodiments, the mapping platform 107 may periodically communicate with the client 105 via the processing means to update a local cache of the map data stored on the client 105. Accordingly, in some example embodiments, the map data may also be stored on the client 105 and may be updated based on periodic communication with the mapping platform 107.

The mapping platform 107 may be communicatively coupled to the client 105, via the network 109. In an embodiment, the mapping platform 107 may communicate with the OEM cloud 103 via the network 109, which in turn may be connected to the client 105. The client 105 may be any user accessible device such as a mobile phone, a smartphone, a portable computer, and the like that is portable in itself or as a part of another portable/mobile object such as a vehicle. In some example embodiments, the client 105 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In this context, the user may be an autonomous or semi-autonomous vehicle. The client may comprise processing means such as a central processing unit (CPU), storage means such as onboard read only memory (ROM) and random access memory (RAM), acoustic sensors such as a microphone array, position sensors such as a GPS sensor, orientation sensors such as gyroscope, motion sensors such as accelerometer, a display enabled user interface such as a touch screen display, and other components as may be required for specific functionalities of the client 105. Additional, different, or fewer components may be provided. For example, the client 105 may be configured to execute and run mobile applications such as a messaging application, a browser application, a navigation application, and the like.

The network 109 may be wired, wireless, or any combination of wired and wireless communication networks, such as cellular, Wi-Fi, internet, local area networks, or the like. In one embodiment, the network 109 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

FIG. 2A illustrates a block diagram of the data service 101 for providing traffic data, in accordance with one or more example embodiments. The data service 101 may include a processing means such as at least one processor 201a, storage means such as at least one memory 203a, and a communication means such as at least one communication interface 205a. The processor 201a may retrieve computer program code that may be stored in the memory 203a for execution of the computer program code. In some embodiments, the data service 101 may be implemented as part of the mapping platform 107.

FIG. 2B illustrates a block diagram of the client 105 for requesting traffic data, in accordance with one or more example embodiments. The client 105 may include a processing means such as at least one processor 201b, storage means such as at least one memory 203b, and a communication means such as at least one communication interface 205b. The processor 201b may retrieve computer program code instructions that may be stored in the memory 203b for execution of the computer program code instructions. In addition, the client 105 may be equipped with any number of sensors (not shown), such as a Global Navigation Satellite System sensor (GNSS sensor e.g. GPS, Galileo, GLONASS etc.), accelerometer, image sensor, and/or gyroscope. Any of the sensors may be used to sense information regarding the location, movement, positioning, or orientation of the device for use in identifying a location of the client 105.

The processors 201a and 201b may be embodied in a number of different ways. For example, the processors 201a and 201b may be embodied as various hardware processing means such as coprocessors, microprocessors, controllers, digital signal processors (DSPs), processing elements with or without accompanying DSPs, or various other processing circuitries including integrated circuits such as, for example, ASICs (application specific integrated circuit), FPGAs (field programmable gate array), microcontroller units (MCU), hardware accelerators, special-purpose computer chips, or the like. As such, in some embodiments, the processors 201a and 201b may include processing cores configured to perform independently. A multi-core processor may enable multiprocessing within a single physical package. Additionally or alternatively, the processors 201a and 201b may include one or more processors configured in tandem via the bus to enable independent execution of instructions, pipelining and/or multithreading.

Additionally or alternatively, the processors 201a and 201b may include processors capable of processing large volumes of workloads and operations to provide support for big data analysis. In an example embodiment, the processors 201a and 201b may be in communication with memories 203a and 203b respectively via buses for passing information among components of structure 100. The memories 203a and 203b may be non-transitory and may include, for example, one or more volatile and/or non-volatile memories. In other words, for example, the memories 203a and 203b may be electronic storage devices (for example, a computer readable storage medium) comprising gates configured to store data (for example, bits) that may be retrievable by a machine (for example, a computing device like the processors (201a and/or 201b). The memories 203a and 203b may be configured to store information, data, content, applications, instructions, or the like, for enabling the apparatus to carry out various functions in accordance with an example embodiment of the present invention. For example, the memories 203a and 203b may be configured to buffer input data for processing by the processors 201a and 201b respectively. As exemplarily illustrated in FIG. 2A and FIG. 2B, the memories 203a and 203b may be configured to store instructions for execution by the processors 201a and 201b respectively. As such, whether configured by hardware or software methods, or by a combination thereof, the processors 201a and 201b may represent entities (for example, physically embodied in circuitry) capable of performing operations according to an embodiment of the present invention while configured accordingly. Thus, for example, when the processors 203 and 303 are embodied as ASICs, FPGAs or the like, the processors 201a and 201b may be specifically configured hardware for conducting the operations described herein. Alternatively, as another example, when the processors 201a and 210b are embodied as an executor of software instructions, the instructions may specifically configure the processors 201a and 201b to perform the algorithms and/or operations described herein when the instructions are executed. However, in some cases, the processors 201a and 201b may be processor specific devices (for example, mobile terminal or fixed computing devices) configured to employ an embodiment of the present invention by further configuration of the processors 201a and 201b by instructions for performing the algorithms and/or operations described herein. The processors 201a and 201b may include, among other things, clocks, arithmetic logic units (ALU) and logic gates configured to support operation of the processors 201a and 201b.

In some embodiments, the processors 201a and 201b may be configured to provide Internet-of-Things (IoT) related capabilities to users of the data service 101 and the client 105 respectively, where the users may be a traveler, a rider, a pedestrian, and the like. In some embodiments, the users may be or correspond to an autonomous or semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The data service 101 and the client 105 may be accessed using the communication interfaces 205a and 205b respectively. The communication interfaces 205a and 205b may provide interfaces for accessing various features and data stored in the data service 101 and the client 105.

FIG. 3 illustrates a flow chart 300 representing general overview of steps performed by the client 105 and the data service 101 for executing the traffic data protocol, in accordance with an example embodiment. Blocks 301, 303, 305, 319, 321, and 323 of the flowchart 300 may be performed by the client 105 for retrieving the traffic data. Blocks 307, 309, 311, 313, 315, and 317 of the flowchart 300 may be performed by the data service 101 for providing the traffic data updates.

At block 301, the method comprises determining at least one map area comprising road segments. The map area may be referred to by a map area identifier or map tile identifier. At block 303, the method comprises determining road segment identifiers for the road segments of the at least one map area. In various embodiments, the coded map version agnostic identifiers may be the road segment identifiers.

At block 305, the method comprises sending a request for the traffic data from the client to the data service. The request may identify the map area. The client may then wait for the data service to provide the requested traffic data. The operations performed by the data service start at block 307, where the method comprises receiving the request for the traffic data from the client.

At block 309, the method comprises determining road segment identifiers corresponding to each of the road segments of the at least one map area at the data service side. At block 311, the method comprises determining traffic data for at least a portion of the road segment identifiers at the data service side. The traffic data is obtained from a traffic data source. For example, the traffic data source may be the mapping platform 107 or the memory 203a of the data service.

At block 313, the method comprises determining a plurality of traffic ranges based on the obtained traffic data. At block 315, the method may comprise generating a subtree data structure set, each subtree data structure of the subtree data structure set corresponding to a traffic range of the plurality of traffic ranges. Each subtree data structure encodes road segment identifiers corresponding to the respective traffic range. In an example embodiment, the subtree data structure is a prefix hash subtree and/or a prefix-compressed hash subtree.

At block 317, the method comprises providing the subtree data structure set to the client from the data service. For example, the data service may transmit the requested traffic data as the subtree data structure set, to the client. The client resumes operations at block 319, where the method comprises receiving the subtree data structure set from the data service. The subtree data structure set may comprise a plurality of subtree data structures. The subtree data structures in the set may correspond to traffic ranges.

At block 321, the method comprises associating a road segment to a corresponding traffic range based on the road segment identifier satisfying one subtree data structure of the traffic range. At block 323, the method may additionally or optionally comprise providing the traffic range as traffic data for the road segment to a navigation application. The navigation application may be a map display, a routing engine and the like.

FIG. 4 illustrates a flowchart 400 of operations performed by the data service 101 of FIG. 2A for providing traffic data, in accordance with an example embodiment. Starting at block 401, the data service 101 may be configured to receive a request for traffic data corresponding to road segments of at least one map area (e.g., map area ID or map tile ID) from the client 105. The data service 101 may determine the at least one map area in the data service version of digital map stored in the memory 203a. In various embodiments, the at least one map area is independent of a version of the digital map. In various embodiments, the request may further comprise a traffic resolution parameter, at least one functional class, and/or validity time frame for the map tile ID.

At block 403, the data service 101 may be configured to determine the road segment identifiers corresponding to each of the road segment of the at least one map area. The data service 101 may access map version agnostic information for each of the road segments of the at least one map area. For example, the data service 101 may store (e.g., in the memory 203a) a geographic database storing the data service version of the digital map. A segment record corresponding to the each of road segments may be accessed and map version agnostic information may be extracted therefrom. In an example embodiment, elements of each of the road segment records to be accessed are pre-established and/or defined. In various embodiments, the map version agnostic map information/data accessed may include a road name, a direction of travel of a segment, a functional class of a segment, speed limit, and/or the like.

The data service 101 may determine the map version agnostic identifiers corresponding to each of the road segments of the at least one map area using the map version agnostic information. For example, one or more map version agnostic elements of the map information corresponding to each of the road segment may be used to generate the map version agnostic identifier of the road segment. In an example embodiment, the one or more map version agnostic elements of the map information and an order in which map version agnostic elements are combined to generate the map version agnostic identifier is pre-established and/or defined. The data service 101 and the client 105 are both configured to generate map version agnostic identifiers in the same pre-established and/or defined way (e.g., using the same elements of map information combined in the same order). For example, the map version agnostic identifier may be generated using a map version agnostic identifier algorithm. The data service 101 and the client 105 may use the same map version agnostic identifier algorithm. In an example embodiment, the map version agnostic identifier may be a text string generated by concatenating the functional class and the travel direction to the road name. Further, the data service 101 may code each of the map version agnostic identifiers using one or more coding functions. In an embodiment, the one or more coding functions include one or more hashing functions. For example, the one or more coding functions may include a deterministic hashing function such as a secure hash algorithm (SHA), MD5 message-digest algorithm, and/or the like. The data service 101 may deliver the coded map version agnostic identifiers as the road segment identifiers.

At block 405, the data service 101 may be configured to determine the traffic data for at least a portion of the road segment identifiers. In an embodiment, the data service 101 may obtain the traffic data from the memory 203a (i.e., data service version of the digital map). In various embodiments, the traffic data may be speed predictions of the road segments of the at least one map area. In an embodiment, the speed predictions may be predictions made from historical, real-time traffic data, or a combination of both. In an embodiment, the data service 101 may determine traffic data of each of first road segments among the road segments of the at least one map area. For example, the road segments may or may not contain traffic data (or speed data in some example embodiments). Road segments which contain the traffic data are termed as the first road segments. Road segments which do not contain the traffic data are termed as second road segments. According to some embodiments, the data service 101 may determine the traffic data for at least a portion of the road segment identifiers (e.g., for first road segments) in the validity time frame present in the request. According to some other embodiments, the data service 101 may extract the at least one functional class of the at least one map area from the request. The data service 101 may determine traffic data only for road segments that are associated with the at least one functional class (FC) parameter. For example, functional classes of the road segments may indicate types of road segments in the map. In various embodiments, the road segment types may be highways, freeways, regional roads, alleys and/or the like. In an embodiment, the functional class parameter may be a numbered value. For example, if the functional class (FC) is one (i.e., FC=1), the data service 201 may determine traffic data of highways in the at least one map area.

At block 407, the data service 101 may be configured to determine the plurality of traffic ranges based on the obtained traffic data. In some example embodiments, a traffic range may mean to be one particular range of traffic speed. The data service 101 may determine the plurality of road segment identifier sets for the road segment identifiers. Each road segments identifier (e.g., road segment identifiers of the first road segments) belonging to respective one of the plurality of ranges may be added to a respective road segment identifier set. For example, if a road segment identifier set has a traffic speed range of 21-30 km/h, then all the road segment identifiers falling within or on the range of 21-30 km/h are members of the road segment identifier set with the range 21-30 km/h. The number of road segment identifier sets to be determined is based on a maximum traffic speed of the first road segments and the traffic resolution parameter. For example, if the maximum traffic speed of the first road segments is 120 km/h and the traffic resolution value is 30, then four road segment identifier sets (i.e., maximum traffic speed±traffic resolution parameter) may be determined of ranges 1-30 km/h, 31-60 km/h, 61-90 km/h, and 91-120 km/h. In an embodiment, the data service 101 may extract the traffic resolution parameter from the request. In alternate embodiment, the data service 101 may determine the traffic resolution parameter using the at least one functional class (FC) parameter present in the request. For example, if FC=1, which may mean highways of the map area, the traffic resolution parameter for FC=1 is a default value stored in the data service 101. In alternate embodiments, the ranges may be expressed using a predetermined quality scale, such as "Free-Flow", "Light Traffic", "Moderate Traffic", "Heavy Traffic", and/or "Blocked".

At block 409, the data service 101 may be configured to generate the subtree data structure set, each subtree data structure of the subtree data structure set corresponding to a traffic range of the plurality of traffic ranges. For example, the data service 101 may generate a plurality of subtree data structures for the plurality of road segment identifier sets. Each subtree data structure of the plurality of subtree data structures may correspond to a respective one of the plurality of road segment identifier sets. In various embodiments, each subtree data structure of the plurality of subtree data structures may encode all road segment identifiers of the respective one of the plurality of road segment identifier sets. The data service 101 may generate a plurality of identifier test sets for the plurality of subtree data structures/ the plurality of road segment identifier sets. Each identifier test set of the plurality of identifier test set may correspond to a respective one of the plurality of subtree data structures.

For example, all road segment identifiers of each identifier test set may be tested with the respective one of the plurality of subtree data structures to determine a match for the respective subtree data structure. For example, if any road segment identifier of a sample identifier test set (T_0) satisfies a sample subtree data structure (S_0) (e.g., of 'm' levels), then a match is determined for the sample subtree data structure and the data service 101 may reject the sample subtree data structure. The data service 101 may then generate a larger sized subtree data structure (e.g., of size 'm+1' levels). The data service 101 may again code the larger sized subtree data structure with all road segment identifiers of a sample road segment identifier set corresponding to the sample subtree data structure. According to some example embodiments, the testing process may be stopped, when no match is determined for the larger sized subtree data structure. In this way, the processing may be executed for other subtree data structures of the plurality of subtree data structures and the data service 101 may generate an ordered list of subtree data structure set, where the subtree data structure set contains a plurality of subtree data structures that have passed the aforementioned testing process.

At block 411, the data service 101 may be configured to transmit/provide the encoded traffic data comprising the subtree data structure set of the at least one map area, to the client 105. The encoded traffic data may further comprise a total count of encoded road segments, time information of the traffic data of the first road segments and the like. In an embodiment, the data service 101 may compute the total count of encoded road segments. For example, a number of the first road segments of the at least one map area may be the total count of encoded road segments. In an embodiment, the time information (such as validity time frame) of the traffic data may be obtained from the database.

FIG. 5 illustrates a flowchart 500 of operations performed by the data service 101 of FIG. 2A for generating the subtree data structure set, in accordance with an example embodiment. Starting at block 501, the data service 101 may be configured to generate the subtree data structure for each of the plurality of traffic ranges. For example, the data service 101 may initialize the subtree data structure for each of the plurality of traffic ranges with a size that is relatively small, such that the probability of false positive is arbitrarily high. The plurality of traffic ranges (i.e., road segment identifier sets) may comprise the road segment identifiers of the first road segments. The data service 101 may add all road segment identifiers of the respective one of the plurality of traffic ranges to a respective initialized subtree data structure. For example, consider a sample subtree data structure which may correspond to the sample road segment identifier set. All the road segment identifiers (i.e., coded map version agnostic identifiers) in the sample road segment identifier set are added to the sample subtree data structure. Since the sample road segment identifier set corresponds to a sample range of traffic data, the sample subtree data structure may encode all sample road segments belonging to the sample range of traffic data.

At block 503, the data service 101 may be configured to determine the identifier test set for each of the subtree data structures. The identifier test set may comprise the road segment identifiers of the second road segments and one or more road segment identifiers among the road segment identifiers of the first road segments. For example, the sample identifier test set determined for the sample subtree data structure may contain the road segment identifiers of the second road segments and all the road segment identifiers of the first road segments except the road segment identifiers in the sample road segment identifier set. For example, in short, the sample identifier test set determined for the sample subtree data structure may be a complement set for the sample road segment identifier set. For example, consider three subtree data structures SDS_0, SDS_1, and SDS_2 which may correspond to three road segment identifier sets S_0, S_1, and S_2 respectively. An identifier test set T_0 may be determined (e.g., by the data service 101) for the subtree data structure SDS_0, such that members of the identifier test set T_0 are the road segment identifiers of the second road segments and road segment identifiers of the road segment identifier sets S_1 and S_2 (i.e., a complement set for the set S_0). Similarly, the identifier test sets T_1 and T_2 may be the complement set for the set S_1 and the set S_2 respectively.

At block 505, the data service 101 may be configured to determine whether any road segment identifier of the respective one of the identifier test sets satisfies the respective subtree data structure. For example, the sample identifier test set determined at block 503 may be used to test the sample subtree data structure to determine whether any road segment identifier of the sample identifier test set satisfies the sample subtree data structure.

When it is determined that none of the element (road segment identifier) of the respective one of the identifier test sets satisfy the respective subtree data structure, the process 500 (i.e., flowchart) may continue with block 507. At block 507, the data service 101 may be configured to output the respective subtree data structure to generate the subtree data structure set. For example, a subtree data structure module operating on and/or being executed by the data service 101 may output the respective subtree data structure, at block 507, to a traffic data generation module operating on and/or being executed by the data service 101.

When it is determined that at least one element (road segment identifier) of the respective one of the identifier test sets satisfies the respective subtree data structure, the process 500 may continue with block 509. At block 509, the data service 101 may be configured to generate the new subtree data structure replacing the respective subtree data structure. In various embodiments, the data service 101 may reject the respective subtree data structure. For example, if the respective subtree data structure, at block 505, is of size m (e.g., a tree of 'm' levels), the data service 101 may initialize the new subtree data structure of size m+n (e.g., a tree of 'm+n' levels). As used herein, n is a positive integer. In an example embodiment, n is 1, such that the new subtree data structure increases in size by one level. The data service 101 may be configured to encode (add) the newly initialized subtree data structure with all road segment identifiers of a respective road segment identifier set that correspond to the respective subtree data structure.

As should be understood, once the new subtree data structure is generated, the process 500 may return to block 505, the data service 101 may be configured to determine whether any element of the respective identifier test set satisfies the new subtree data structure. For example, the data service 101 may determine whether any of the road segment identifier of the respective identifier test set is a member of the respective road segment identifier set. Responsive to determining that the new subtree data structure does not indicate that any of the road segment identifier of the respective identifier test set as a member of the respective road segment identifier set, the data service 101 may continue with block 507. Responsive to determining that the new subtree data structure does indicate that at least one of the road segment identifier of the respective identifier test set as a member of the respective road segment identifier set, the data service may continue with block 509 and a new larger subtree data structure is generated for replacing the new subtree data structure. For example, a new larger subtree data structure of size (m+n), where n is a positive integer, may be generated for replacing the new subtree data structure. In an example embodiment, n is 1. The process continues until the subtree data structure for each of the road segment identifier sets indicates that none of the road segment identifiers of a respective one of the identifier test sets is a member of the respective road segment identifier set. The subtree data structure for each of the road segment identifier sets is outputted at block 507.

FIG. 6 provides a flowchart illustrating operations performed by the data service of FIG. 2A to build a subtree data structure encoding road segments belonging to the one particular range of traffic data, in accordance with an example embodiment. In various embodiments, road segment identifier digests may correspond to the aforementioned coded map version agnostic identifiers.

Starting at block 602, an index J is initialized. For example, an index J may be set equal to 1. In an example embodiment, the subtree building module is configured to receive the plurality of data service road segment identifier digests as input. In various embodiments, the index J corresponds to a level of the subtree data structure.

At block 604, a bit value corresponding to level J of the subtree data structure is determined for each of the data service road segment identifier digests. In an example embodiment, determining the bit value corresponding to level J of the subtree data structure for a road segment identifier digest comprises evaluating a coding function corresponding to level J of the subtree based on the road segment identifier digest. For example, the coding function corresponding to level J of the subtree data structure may be evaluated based on the road segment identifier digest being the input of the coding function. In various embodiments, the coding function is a hash function configured to receive a salt that corresponds to the level J of the subtree data structure. In an example embodiment, the coding function is a hash function configured to generate a bit value that corresponds to and/or is equal to a particular bit of a hash generated by passing the hash function the road segment identifier digest and the salt corresponding to level J of the subtree data structure. In an example embodiment, the salt corresponding to level J of the subtree data structure is the value of J (e.g., the salt is equal to the level of the subtree).

At block 606, level J of the subtree data structure is generated based on the bit values determined for the plurality of road segment identifier digests.

At block 608, it is determined if the index J is equal to the goal depth of the subtree data structure K. In various embodiments, K may correspond to the aforementioned 'm' levels of a subtree data structure. When, at block 608, it is determined that the index J is not equal to the goal depth of the subtree data structure K, the process continues to block 610. At block 610, the index J is incremented, and the process returns to block 604. For example, the index J may be incremented by increasing the value of J by one. When, at block 608, it is determined that the index J is equal to the goal depth of the subtree data structure K, the process continues to block 612.

At block 612, the built subtree data structure is returned. For example, when it is determined that the subtree data structure is of the goal depth (e.g., has the K levels), the subtree data structure is returned. In various embodiments, a succinct data structure is generated that encodes and/or is based on the subtree data structure. In various embodiments, a succinct data structure is a bit string or an array of bits that encodes a binary tree or subtree. For example, a succinct data structure may be generated that encodes the subtree data structure in a bit string or bit array. In various embodiments, the encoding the subtree data structure as a succinct data structure acts to compress the subtree data structure. For example, the succinct data structure may be a prefix-compressed hash subtree. For example, the subtree building module may provide and/or return the subtree data structure to the subtree data structure producing module.

FIG. 7 illustrates a flow chart 700 of operations performed by the client 105 of FIG. 2B for requesting the traffic data, in accordance with an example embodiment. Starting at block 701, the client 105 may be configured to determine at least one map area comprising road segments. According to some example embodiments, the client version of the digital map (i.e., map) may be partitioned in two-dimensions (for example in a gridded, tiled, and/or tessellated form). In various embodiments, the number of cells of the grid may determine a level (e.g., first level of partition, second level of partition and so on) of the client version of the digital map. For example, the client version digital map may be divided into 4 geographical regions in level-1 (e.g., first level of partition), 16 geographical regions in level-2 (e.g., second level of partition), and so on. As used herein, the geographical region is the map area or the map tile. Accordingly, the map area may cover an area of the client version of the digital map. Each of the map area (i.e., a cell of the grid) may be referred by identifiers (i.e., map area identifiers/map tile identifiers). In an alternate embodiment, the map area may indicate a current area visible on the screen of the navigation application and the like (i.e., client 105). In an alternate embodiment, the map area may be indicated by a polygon shape, the vertices of the shape corresponding to location coordinate pairs. According to some example embodiments, the map area comprises road segments. Alternate embodiments may cover a geographical partition in three dimensions (for example in a cubed form).

In an embodiment, the client 105 (e.g., the navigation application) may be triggered when a user or an application associated with the client 105 provides a start point and a destination point. The client 105 may determine a potential route between the start point and the end point. For example, the client 105 may use Dijkstra's algorithm, shortest path algorithm, minimum spanning tree algorithm and the like for determining the potential route. In various embodiments, the potential route may be a fastest route to reach the destination point, a short distance route between the start point and the destination point, and the like. The client 105 may determine a geographic region encompassing the potential route. For example, the client 105 may choose a level (e.g., any arbitrary partition of client version of the digital map) to determine the geographic region encompassing the potential route, such that the level contains sufficient amount of traffic information/data of the potential route. Accordingly, the client 105 may determine at least one map area ID that covers the geographic region encompassing the potential route. For example, the client 105 may use the potential route and the level of the client version of the digital map to determine the at least one map area ID that covers the geographic region encompassing the potential route.

At block 703, the client 105 may be configured to determine the road segment identifier for each of the road segments in the at least one map area. In various embodiments, the client 105 may generate map version agnostic identifiers to determine the road segment identifiers. For example, the client 105 may obtain the map version agnostic information of the map area ID to generate the map version agnostic identifier for each of the road segments of the map area ID. For example, the client 105 may store a geographic database storing the map version agnostic information of the client version of the digital map. A segment record corresponding to a road segment may be obtained and map version agnostic information may be extracted therefrom. In an example embodiment, elements of the segment record to be obtained are pre-established and/or defined. For example, the map version agnostic information obtained may include a name of the road segment, a travel direction of the road segment, a functional class of the road segment, speed limit of the road segment, and/or the like.

The map version agnostic identifiers may be generated using the map version agnostic information. For example, one or more map version agnostic elements of the map information corresponding to a road segment may be used to generate a map version agnostic identifier for the road segment. In an example embodiment, the one or more map version agnostic elements of the map information and an order in which map version agnostic elements are combined to generate the map version agnostic identifier is pre-established and/or defined. The data service 101 and the client 105 are both configured to generate map version agnostic identifiers in the same pre-established and/or defined way (e.g., using the same elements of map information combined in the same order). For example, the map version agnostic identifier may be generated using a map version agnostic identifier algorithm and the data service 101 and the client 105 may use the same map version agnostic identifier algorithm. In an example embodiment, the map version agnostic identifier may be a text string generated by concatenating the functional class and the travel direction to the road name. Further, the client 105 may code each of the map version agnostic identifier using one or more coding functions. In an example embodiment, the one or more coding functions may include one or more hashing functions. For example, the one or more coding functions may include a deterministic hashing function such as a secure hash algorithm (SHA), MD5 message-digest algorithm, and/or the like. The coded map version agnostic identifiers are represented as the road segment identifiers.

At block 705, the client 105 may be configured to transmit the request indicating the at least one map area. According to some example embodiments, if the request comprises more than one map area ID, the client 105 may request the traffic data in form of a bounding box, polygon, map area ID range and/or the like. In various embodiments, the bounding box/map area range is a set comprising one or more map area IDs. In various embodiments, the request for the traffic data may further comprise at least one functional class parameter of road segments of the at least one map area, a validity time frame of the at least one map area (e.g., a time frame for which traffic data need to be updated). According to some example embodiments, the client 105 may determine a validity time frame (entry time and exit time) of the map area while determining the potential route (using spanning tree algorithm and the like).

Furthermore, the client 105 may be configured to determine a traffic resolution value/parameter for the at least one map area. The traffic resolution value of the at least one map area may be used to determine a number of ranges (traffic ranges) the traffic data of the at least one map area to be grouped. According to some example embodiments, the traffic resolution value may be determined by using a maximum traffic speed limit of the map area. For example, the client 105 may contain posted speed limits of the road segments of the map area as an attribute. The client 105 may use the attribute to determine the maximum traffic speed limit of the map area. Further, the client 105 may use the maximum traffic speed limit of the map area to determine the traffic resolution value. For example, if the maximum traffic speed data of the road segments of the map area is 120 km/h then four traffic speed groups of ranges 1-30 km/h, 31-60 km/h, 61-90 km/h, and 91-120 km/h are sufficient to group the road segments of the map area. If the maximum traffic speed data of the road segments of the map area is 50 km/h, then the traffic speed groups of ranges 1-30 km/h and 31-60 km/h may not be sufficient to group the road segments (as in case of maximum traffic speed=120 km/h). Accordingly, traffic speed groups of ranges 1-10 km/h, 11-20 km/h, 21-30 km/h, 31-40 km/h, and 41-50 km/h are required to group the road segments of the map area to provide reliable speed information. Further, the client 105 may be configured to transmit the traffic resolution value as part of the request to the data service 101.

At block 707, the client 105 may be configured to receive, from the data service 101, the encoded traffic data comprising at least one subtree data structure set for the at least one requested map area. The subtree data structure set may comprise an order list of a plurality of subtree data structures, where each subtree data structure in the subtree data structure set corresponds to one particular traffic speed range. According to some example embodiments, a subtree data structure appearing first in the ordered list of subtree data structure set may correspond to lower traffic speed range and vice versa. According to some embodiments, each subtree data structure of the subtree data structure set may encode one or more road segment identifiers of the road segments of the map area belonging to one particular range of traffic speed data. In various embodiments, each subtree data structure in the subtree data structure set may be mutually exclusive to each other. For example, consider a subtree data structure set which may contain three subtree data structures SDS_0, SDS_1, and SDS_2 (from above example). The road segment identifiers encoded in the subtree data structure SDS_0 may not be present in subtree data structures SDS_1 and SDS_2. Similarly, the road segment identifiers in the subtree data structure SDS_1 may not be present in subtree data structures SDS_0 and SDS_2 and the road segment identifiers in the subtree data structure SDS_2 may not be present in the subtree data structures SDS_1 and SDS_0. The encoded traffic data may further comprise a total count of encoded road segments and/or time information of the traffic data of the at least one map area. The time information of the traffic data may be used to validate the traffic data. For example, the time information may indicate a period of time for which the traffic data may be valid. According to some example embodiments, the total count of encoded road segments may be used to determine a trigger whether to update or not to update the traffic data on the client device.

At block 709, the client 105 may be configured to check for the match of each of the road segment identifier in the subtree data structure set. For example, the client 105 may check whether a road segment identifier satisfies any subtree data structure of the subtree data structure set. In various embodiments, the road segment identifiers are the coded map version agnostic identifiers. Accordingly, each coded map version agnostic identifier may be checked with each subtree data structure of the subtree data structure set to determine whether there is a match. According to various embodiments, the road segment identifiers with match are termed as the first road segment identifiers and the road segment identifiers without match as are termed as second road segment identifiers.

The client 105 may be configured to generate the traffic data for each of the first road segment identifiers. In various embodiments, the client 105 may assign a traffic range (e.g. speed range) for each of the first road segment identifiers. As described above, each subtree data structure of the subtree data structure set may correspond to one particular traffic speed range. The client 105 may assign the range of a subtree data structure to a first road segment identifier, if the first road segment identifier satisfies the subtree data structure. According to various embodiments, the client 105 may determine an index value of the subtree data structure in the subtree data structure set to compute a speed value for each of the first road segment identifiers. For example, the client 105 may use the index value of the subtree data structure and the traffic resolution value to compute the speed value of a first road segment identifier. For example, the client 105 may assign the speed value for the first road segment identifier as ((index value of the subtree data structure+0.5)*traffic resolution value).

Additionally, the client 105 may be configured to determine a total count of decoded road segments for the map area. In various embodiments, a total number of first road segment identifiers may be the total count of decoded road segments. In an alternate embodiment, the client 105 may initialize a variable with initial value set to zero. The client may add a value (e.g., value=1) to the variable, for each match of the road segment identifiers in the subtree data structure set. Once, all the road segment identifiers are checked with each subtree data structure of the subtree data structure set, the variable may be the total count of decoded road segments. The client 105 may determine a trigger whether to update or not to update the traffic data using the total count of decoded road segments and the total count of encoded road segments. For example, the client 105 may determine a ratio of the total count of decoded road segments and the total count of encoded road segments. If the ratio is above a threshold value (e.g., threshold value=0.5), the client 105 may update the traffic data. If the ratio is below the threshold value, the traffic data may not be updated.

According to some embodiments, the client 105 may assign the traffic data for each of the second road segment identifiers, based on local data. However, the client 105 may also assign the traffic data for each of the first road segment identifiers, if the ratio is below the threshold value. In an embodiment, the client 105 may store the local data. In alternate embodiment, the client 105 may obtain the local data from a local database. In various embodiments, the local data may comprise posted speed limit data, traversal cost data, historic traffic speed pattern data, and/or the like. For example, the client 105 may obtain local data for the second road segment identifiers to generate the traffic data for each the second road segment identifiers. For example, the traffic data for the second road segment identifiers may be derived from the posted speed limit data, the traversal cost data, and/or the historical traffic speed pattern of the second road segment identifiers.

At 711, the client 105 may provide the traffic data, to the navigation application, for the road segments (e.g., for first road segment identifiers and second road segment identifiers) of the map tile ID. In some exemplary embodiment the navigation application may be but not limited to a map display, a routing engine and the like.

Accordingly, blocks of the flowcharts 300 to 700 support combinations of means for performing the specified functions and combinations of operations for performing the specified functions for performing the specified functions. It will also be understood that one or more blocks of the flowchart 300, 400, 500, 600, 700 and combinations of blocks in the flowchart 300, 400, 500, 600, 700 can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 201a and/or 201b, the memory 203a and/or 203b and/or a device or circuit for executing instructions or executing an algorithm for processing information as described above.

FIG. 8 illustrates a map area 800 for which traffic data may be updated by the client 105, in accordance with one or more example embodiments. In an embodiment, as described with reference to FIG. 7, the client 105 determines the map area ID 800 that covers the geographic region encompassing the potential route. In an alternate embodiment, the map area 800 may indicate a current area visible on the screen of the client 105. The map area comprises one or more road segments. For example, numerals 803, 805, 807, 809, 811, 813, 815, 817, 819, and 821 may indicate road segments in the map area 800. In the map area 800, a direction of travel of a vehicle, a pedestrian, a rider, or the like may be indicated by a numeral 801. The road segments within the map area 800 may be classified based on whether they have their corresponding traffic data. For example, the road segments 803, 805, 809, 811, 813, 815, and 821 may have the traffic data (e.g., speed data) and may therefore be grouped together (hereinafter referred as first road segments). Similarly, the road segments 807, 817, and 819 may not have the traffic data and may therefore be grouped in a different group (hereinafter referred as second road segments).

According to some example embodiments, the client 105 may generate the request the data service 101 to provide traffic data for the map area 800. For example, the request may include an identifier of the map area 800. According to some embodiments, the server 107b of the mapping platform 107 may be the data service 101. Accordingly, the server 107b of the mapping platform 107 may perform the operations performed by the data service 101.

The client 105 may transmit the request, to the server 107b, to update the traffic data for the map area 800. The server 107b may receive the request. The server 107b may obtain the traffic data of the map area 800 from the database 107a and determine the traffic data for the first road segments 803, 805, 809, 811, 813, 815, and 821 as 10 km/h, 15 km/h, 35 km/h, 48 km/h, 60 km/h, 32 km/h, and 58 km/h respectively.

The server 107b may determine the maximum traffic data associated with the first road segments (Example: 60 km/h). The server 107b may compute the number of traffic groups using the maximum traffic data and the resolution parameter. For example, the number of traffic groups may be equal to the ratio of the highest traffic data (i.e. 60 km/h) and the resolution parameter. For example, if the resolution parameter is 20, then there may be three traffic ranges. The server

107b may generate three road segment identifiers sets (S_0, S_1, and S_2) for the ranges 1-20 km/h, 21-40 km/h, and 41-60 km/h.

The server 107b may generate the road segment identifiers of the road segments 803, 805, 807, 809, 811, 813, 815, 817, 819, and 821. The server 107b may add the road segment identifiers of the first road segments to the three road segment identifiers sets. For example, the road segment identifiers of road segment 803 and 805 may be added to the first road segment identifiers set of range (1-20), since the road segments 803 and 805 fall within the range (1-20). Similarly, the road segment identifiers of road segments 809 and 815 may be added to the second road segment identifiers set of range (21-40), and the road segment identifiers of road segments 811, 813, and 821 may be added to the third road segment identifiers set of range(41-60).

The server 107b may generate a subtree data structure for each of the three road segment identifiers sets. For example, subtree data structures SDS_0, SDS_1, and SDS_2 may be initialized for the first road segment identifiers set (S_0), the second road segment identifiers set (S_1), and the third road segment identifiers set (S_2), respectively. The server 107b may add all coded map version agnostic identifiers (e.g., the road segment identifier of 803 and 805) of the first road segment identifiers set (S_0) to the subtree data structure SDS_0. Similarly, the road segment identifiers 809 and 815 of the second road segment identifiers set (S_1) are added to the subtree data structures SDS_1. Further, the road segment identifiers 811, 813, and 821 of the third road segment identifiers set (S_2) are added to the subtree data structure SDS 2. In an example embodiment, the subtree data structure is a prefix hash subtree and/or a prefix-compressed hash subtree.

The server 107b may generate an identifier test set for each of the subtree data structures. For example, three identifier test sets T_0, T_1, and T_2 may be generated for the three subtree data structures SDS_0, SDS_1, and SDS_2 respectively. Identifier test set T_0 may be the complement set for the first road segment identifier set (S_0). For example, the identifier test set T_0 contains the road segment identifiers of the road segments 807, 809, 811, 813, 815, 817, 819, and 821. Similarly, the identifier test set T_1 contains the road segment identifiers of the road segments 803, 805, 807, 811, 813, 817, 819, and 821. Further, the identifier test set T_2 contains the road segment identifiers of the road segments 803, 805, 807, 809, 817, 819, and 815).

The server 107b may determine whether, the subtree data structure SDS_0 is satisfied by any of the element of the identifier test set T_0 (e.g., 807, 809, 811, 813, 815, 817, 819, and 821). Similarly, the subtree data structure SDS_1 and SDS_2 may be checked with all road segment identifiers of the identifier test set T_1 (e.g., 803, 805, 807, 811, 813, 817, 819, and 821) and T_2 (e.g., 803, 805, 807, 809, 817, 819, and 815) respectively.

If, any one of the road segment identifier of the identifier test set (T_0) matches with the subtree data structure (SDS_0), then the subtree data structure (SDS_0) is rejected and new subtree data structure of larger size (e.g., m+1, if SDS_0 of size "m" levels) is generated, which encodes the road segment identifiers of 803 and 805. Again the new subtree data structure is tested with the identifier test set (T_0) to determine whether any road segment identifier of the set (T_0) satisfies the new subtree data structure. The test is performed until none of the road segment identifier of set (T_0) matches with the subtree data structure (SDS_0). Similarly, the subtree data structures SDS_1 and SDS_2 may be tested with the identifier test sets T_1 and T_2 respectively to generate false-positive-free subtree data structures (the subtree data structure that does not provide any false positive). The subtree data structure set includes such false-positive-free subtree data structures. The server 107b may transmit the subtree data structure set as the encoded traffic data of the map area 800 to the client 105.

The client 105 may receive the subtree data structure set for the map area 800. The client 105 may generate the road segment identifiers of the road segments 803, 805, 807, 809, 811, 813, 815, 817, 819, and 821. The client 105 may check for a match (e.g., does a road segment identifier satisfy any subtree data structure in the subtree data structure set), for each of the road segment identifiers (e.g., 803, 805, 807, 809, 811, 813, 815, 817, 819, and 821) with each of the subtree data structure (e.g., SDS_0, SDS_1, SDS_2).

Accordingly, the match for the road segments 803 and 805 may be obtained in the subtree data structure SDS_0. In an embodiment, the client 105 may assign the traffic data as the traffic range associated with the matched subtree data structure. In an alternate embodiment, the client 105 may assign the traffic data to the road segments as (subtree data structure index+0.5)*traffic resolution value. For example, the subtree data structure index of the first bloom filter is 0 (zero) in the subtree data structure set, the traffic data of the road segment 803 may be determined as (0+0.5)*20=10 km/h. Similarly, the traffic data of road segments 805, 809, 811, 813, 815, and 821 may be determined to be 10 km/h, 30 km/h, 50 km/h, 50 km/h, 30 km/h, and 50 km/h. The client 105 may use the traffic data of the road segments of the map area 800 to provide navigation assistance.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:
1. A method, comprising:
   determining at least one map area comprising road segments, said map area having at least one map area identifier;
   determining road segment identifiers for the road segments of the at least one map area;
   sending to a data service, a request for traffic data, said request identifying the map area;

receiving from the data service, a subtree data structure set, the subtree data structure set comprising a plurality of subtree data structures, said subtree data structures in the set corresponding to traffic ranges;

associating a road segment to a corresponding traffic range based on the road segment identifier satisfying one subtree data structure of the traffic range; and providing the traffic range as traffic data for the road segment to a navigation application.

2. The method of claim 1, further comprising:
determining a geographic region encompassing at least a portion of a route;
determining for the geographic region, a plurality of map areas covering the at least one portion of a route; and
including the multiple map area identifiers in the request for traffic data.

3. The method of claim 1, further comprising:
determining expected validity timeframes for the traffic data of the at least one map area; and
including the expected validity timeframes in the request.

4. The method of claim 1, wherein the at least one map area corresponds to one or more map areas and wherein the at least one map area identifier corresponds to one or more map tile identifiers.

5. The method of claim 1, wherein the subtree data structure is a prefix hash subtree or a prefix-compressed hash subtree.

6. The method of claim 1, further comprising:
determining a traffic resolution parameter; and
sending the traffic resolution parameter as part of the request.

7. The method of claim 6, wherein the request for traffic data is a request for traffic speed data and the traffic resolution parameter is based on a maximum speed limit of the at least one map area.

8. The method of claim 1, wherein the determining of the road segment identifiers further comprises:
accessing map version agnostic information regarding each of the road segments;
generating a map version agnostic identifier for each of the road segments;
coding the map version agnostic identifier for each of the road segments using at least one coding function; and
providing the coded map version agnostic identifier as the road segment identifier.

9. The method of claim 1, wherein the associating further comprises:
in response to a road segment identifier not satisfying any of the received subtree data structures, assigning traffic data to the road segment based on at least one of a local road segment speed limit parameter, a local road segment traversal cost parameter, or a local historical traffic speed pattern for the road segment.

10. An apparatus, comprising:
at least one memory configured to store computer program code instructions; and
at least one processor configured to execute the computer program code instructions to:
determine at least one map area comprising road segments, said map area having at least one map area identifier;
determine road segment identifiers for the road segments of the at least one map area;
send to a data service, a request for traffic data, said request identifying the map area;
receive from the data service, a subtree data structure set, the subtree data structure set comprising a plurality of subtree data structures, said subtree data structures in the set corresponding to traffic ranges;
associate a road segment to a corresponding traffic range based on the road segment identifier satisfying one subtree data structure of the traffic range; and
provide the traffic range as traffic data for the road segment to a navigation application.

11. The apparatus of claim 10, wherein the at least one processor is further configured to:
determine geographic region encompassing at least a portion of a route;
determine for the geographic region, a plurality of map areas covering the at least one portion of a route;
include the multiple map area identifiers in the request for traffic data.

12. The apparatus of claim 10, wherein the at least one processor is further configured to:
determine expected validity timeframes for the traffic data of the at least one map area; and,
include the expected validity timeframes in the request.

13. The apparatus of claim 10, wherein the at least one map area corresponds to one or more map tiles and wherein the at least one map area identifier corresponds to one or more map tile identifiers.

14. The apparatus of claim 10, wherein the subtree data structure is a prefix hash subtree or a prefix-compressed hash subtree.

15. The apparatus of claim 10, wherein the at least one processor is further configured to:
determine a traffic resolution parameter; and
send the traffic resolution parameter as part of the request.

16. The apparatus of claim 15, wherein the request for traffic data is a request for traffic speed data and the traffic resolution parameter is based on a maximum speed limit of the at least one map area.

17. The apparatus of claim 10, wherein to determine the road segment identifiers, the at least one processor is further configured to:
access map version agnostic information regarding each of the road segments;
generate a map version agnostic identifier for each of the road segments;
code the map version agnostic identifier for each of the road segments using at least one coding function; and
provide the coded map version agnostic identifier as the road segment identifier.

18. The apparatus of claim 10, wherein to associate, the at least one processor is further configured to:
in response to a road segment identifier not satisfying any of the received subtree data structures, assigning traffic data to the road segment based on at least one of a local road segment speed limit parameter, a local road segment traversal cost parameter, or a local historical traffic speed pattern for the road segment.

19. A computer program product comprising a non-transitory computer readable medium having stored thereon computer executable instruction which when executed by at least one processor, cause the at least one processor to carry out operations comprising:
determining at least one map area comprising road segments, said map area having at least one map area identifier;
determining road segment identifiers for the road segments of the at least one map area;
sending to a data service, a request for traffic data, said request identifying the map area;

receiving from the data service, a subtree data structure set, the subtree data structure set comprising a plurality of subtree data structures, said subtree data structures in the set corresponding to traffic ranges;

associating a road segment to a corresponding traffic range based on the road segment identifier satisfying one subtree data structure of the traffic range; and providing the traffic range as traffic data for the road segment to a navigation application.

20. The computer program product of claim 19, the operations further comprising:

determining a geographic region encompassing at least a portion of a route;

determining for the geographic region, a plurality of map areas covering the at least one portion of a route; and including the multiple map area identifiers in the request for traffic data.

21. The computer program product of claim 19, the operations further comprising determining a traffic resolution parameter and sending the traffic resolution parameter as part of the request.

22. The computer program product of claim 21, wherein the request for traffic data is a request for traffic speed data and the traffic resolution parameter is based on a maximum speed limit of the at least one map area.

* * * * *